UNITED STATES PATENT OFFICE.

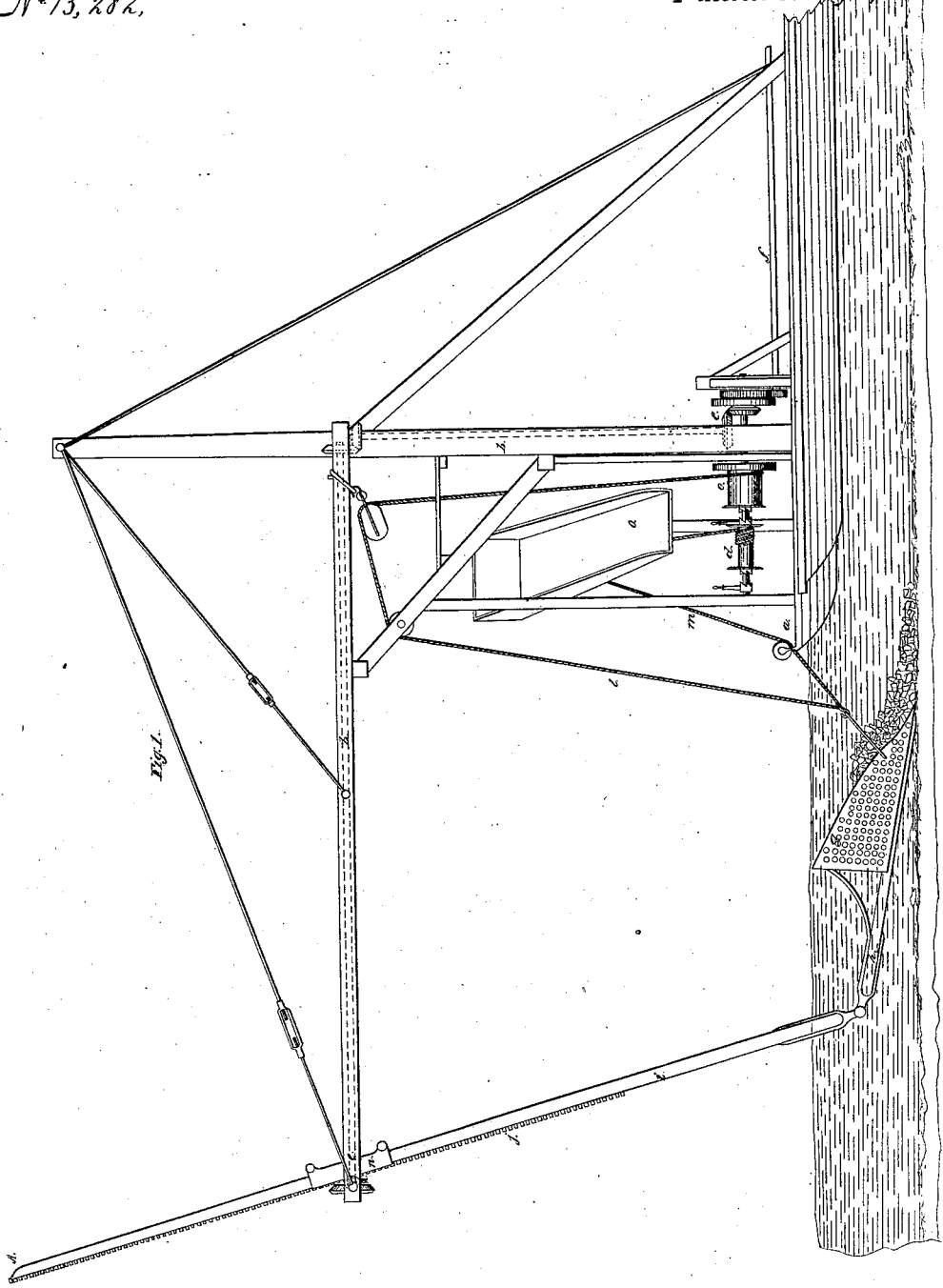

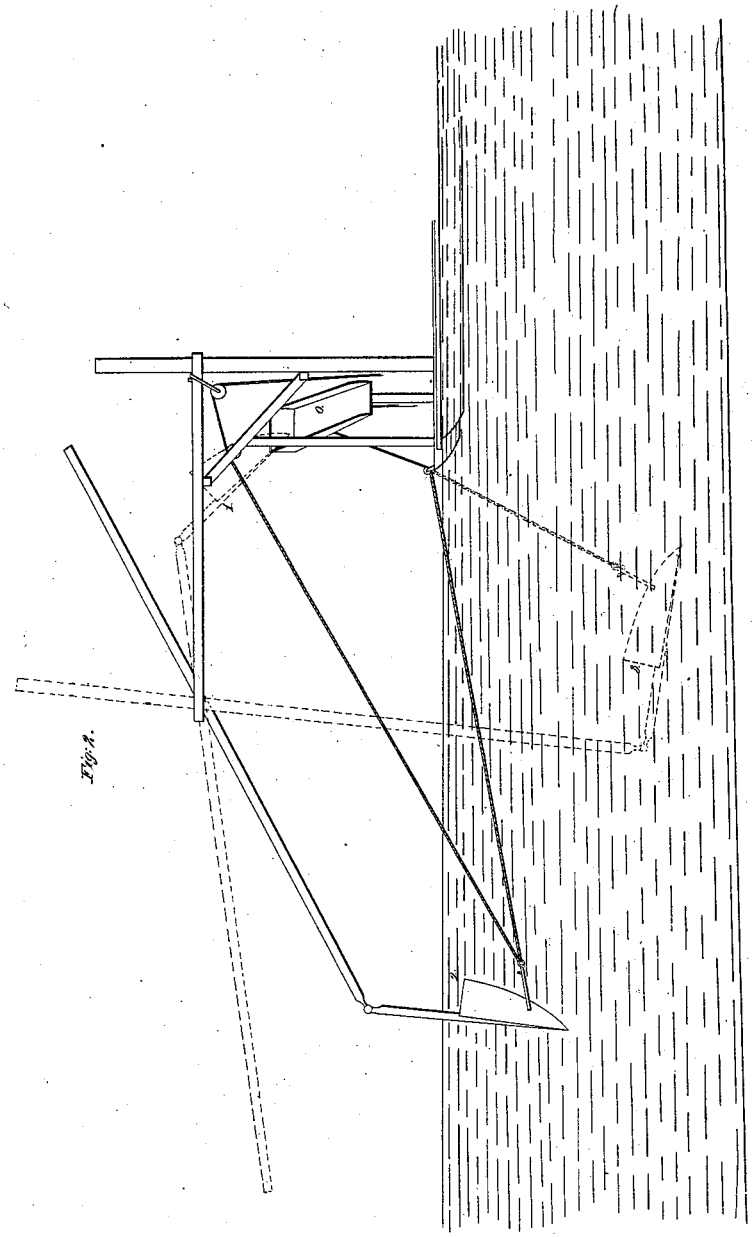

EDWIN WILLIAMS, OF COVINGTON, KENTUCKY.

EXCAVATING-MACHINE.

Specification of Letters Patent No. 13,282, dated July 17, 1855.

*To all whom it may concern:*

Be it known that I, EDWIN WILLIAMS, of Covington, Kenton county, Kentucky, have invented a new and Improved Construction of Excavating-Machine for Raising Substances from the Bottom of Rivers &c.; and I do hereby declare the following to be a full, clear, and exact description thereof, reference being had to the annexed drawings, making part of this specification.

The object of this invention is to enable the excavation of coal, paving boulders and other hard substances from sunken boats or from the beds of rivers or other bodies of water; the invention being more especially applicable and for some time successfully applied by me to the excavation and recovery of the above named refractory substances, and for which the ordinary dredging machines have been found inapplicable.

In the annexed drawings Figue 1 is a side elevation of my machine exhibiting the scoop in the act of excavation. Fig. 2 represents on a smaller scale several different positions of the boom and scoop.

In the accompanying drawings (*a*) is a boat giving support to the machinery. (*b*) is the timber work of a large crane. (*c*) and (*d*) are two separate windlasses of different diameters, and (*e*) is a line of geared shafting; either of these windlasses, or shafting (*e*) are capable by means of ordinary clutch boxes or otherwise of being brought in connection with the driving shaft (*f*) which shaft in the machine employed by me is actuated by a horse power, but it may be worked by steam.

Cables or chains (*l m*)—one from each windlass—connect each with the front of the shovel or scoop (*g*) one cable (*l*) being adapted for lifting the scoop and the other one (*m*) for dragging it along the bottom in the act of excavation. This scoop (which in my machine is made to contain about eight bushels) has a handle (*h*) which is hinged to a boom (*i*). This boom is furnished with a rack (*j*) which gears into a pinion (dotted lines *k*), and is held to its bearings on the pinion by a shoe or stirrup (*n*) hung to the shaft of the pinion (see dotted lines *k*) or to bushes concentric with it. The pinion serves the twofold purpose of a fulcrum around which the boom swings easily forward and backward, and also a means of protrusion and retraction of the boom and shovel. The shoe (*n*) in addition to its just cited purpose keeps the boom from swaying about. The pinion (*k*) is operated by means of bevel gearing (*e*) before alluded to, when brought into connection with the driving power by clutch or otherwise.

In the machine which I have in use I employ in connection with each movement a brake similar to those employed on cranes, by which I am enabled to detain either cable or the pinion in any desired position.

The prominent feature of my machine, particularly distinguishing it from others having a like object is the boom (*i*), capable of longitudinal extension and retraction and of vibration in a vertical plane and reversal of its center of gravity from side to side of the point of bearing. The shank or free extremity (A) of this boom, when so extended by the rack and pinion as to overbalance the shovel end, serves an important purpose in the dumping of the shovel; and the greater weight of the shovel end in the act of presentation is also of service.

The operation is simply as follows: Suppose the shovel to have been brought by the combined agencies of the rack and pinion and of the cable (*l*) to the dumping position, the shank end of the boom, having— by the action of the pinion—been thrown beyond its fulcrum has overbalanced the shovel, and by sinking down to the position shown has elevated the rear edge of the shovel (as at 1 Fig. 2) and discharged the load into the chute (*o*) which conducts into a scow placed alongside the boat. This having been accomplished the cables (*l, m,*) are slackened, and the shovel end of the boom, being brought forward by means of the pinion; descends and swings downward and outward with a surge, which—being augmented by the centrifugal force—carries the shovel to the position represented at (2 Fig. 2.) Then by means of the rack and pinion, and the cable (*l*) the shovel is properly presented for the commencement of the excavating action. The cable (*m*) is then brought into play and drags the scoop forward so as to scrape up its load, which being obtained the front of the shovel is first somewhat elevated by means of the cable *l* and then the shovel is lifted bodily up by the conjoined agencies of the cable (*l*) and of the rack and pinion, until the boom shank overbalancing the shovel, the load is discharged as before described. The shovel then being disengaged from the chute and drawn forward and the pinion and both cables being let go the shovel swings downward and backward again for another excavation. If during the act of excavation—a solid obstacle is encountered, the point is temporarily lifted until it is passed.

It should be stated that this apparatus was designed and is now in frequent and profitable use for digging up submarine boulders for paving and for redeeming sunken coal, for which purposes the ordinary dredging machines have not been found applicable.

I do not claim simply an excavating shovel, having an extended handle capable of longitudinal and vibratory motion, such having been heretofore employed; but

I claim herein as new and of my invention—

An excavating shovel or scoop, provided with one or more cables as described, or their equivalents, and having its rear portion or handle, hinged to one extremity of a boom, which has longitudinal and vibratory motion about an elevated pinion or its equivalent; the unattached extremity of said boom, being made to counterbalance the scoop in the acts of dumping &c., as explained.

In testimony whereof I hereunto set my hand before two subscribing witnesses.

EDWIN WILLIAMS.

Witnesses:
 GEO. H. KNIGHT,
 THOS. W. SCOTT.